United States Patent
Gu

(10) Patent No.: US 10,775,784 B2
(45) Date of Patent: Sep. 15, 2020

(54) UNMANNED AERIAL VEHICLE WITH DECENTRALIZED CONTROL SYSTEM

(71) Applicant: Wing Aviation LLC, Mountain View, CA (US)

(72) Inventor: Kaiwen Gu, Sunnyvale, CA (US)

(73) Assignee: WING Aviation LLC, Mountain View ( * ) Notice: Subject to any disclaimer, the term of this patent is extended or adjusted under 35 U.S.C. 154(b) by 302 days.

(21) Appl. No.: 16/008,271

(22) Filed: Jun. 14, 2018

(65) Prior Publication Data

US 2019/0384288 A1     Dec. 19, 2019

(51) Int. Cl.
| | |
|---|---|
| *G05D 1/00* | (2006.01) |
| *B64C 39/02* | (2006.01) |
| *G05D 1/08* | (2006.01) |

(52) U.S. Cl.
CPC ......... *G05D 1/0055* (2013.01); *B64C 39/024* (2013.01); *G05D 1/0816* (2013.01); *B64C 2201/021* (2013.01); *B64C 2201/024* (2013.01); *B64C 2201/141* (2013.01)

(58) Field of Classification Search
CPC ............ B64C 39/024; B64C 2201/108; B64C 2201/141; B64C 2201/042; B64C 2201/027; B64C 2201/185; G05D 1/00; G05D 1/0072; G05D 1/0077; B64D 17/62; B64D 17/80; B64D 1/0072; B64D 1/105; B64D 43/02

See application file for complete search history.

(56) References Cited

U.S. PATENT DOCUMENTS

| | | | |
|---|---|---|---|
| 8,393,564 B2 * | 3/2013 | Kroo ................. | B64C 3/56 244/6 |
| 9,242,738 B2 * | 1/2016 | Kroo ................. | B64C 3/16 |
| 9,422,139 B1 | 8/2016 | Bialkowski et al. | |

(Continued)

FOREIGN PATENT DOCUMENTS

| | | |
|---|---|---|
| WO | 2016191140 A1 | 12/2016 |
| WO | 2017128062 A1 | 8/2017 |

(Continued)

OTHER PUBLICATIONS

International Search Report and Written Opinion dated Oct. 8, 2019 for corresponding International Patent Application No. PCT/US2019/036510, 13 pages.

*Primary Examiner* — Mussa A Shaawat
(74) *Attorney, Agent, or Firm* — Christensen O'Connor Johnson Kindness PLLC

(57) ABSTRACT

An aerial vehicle may include a control unit configured to send control signals in order to control flight of the aerial vehicle, propulsion units configured to control the attitude of the aerial vehicle, propulsion controllers configured to send commands to a corresponding propulsion unit of the propulsion units based on the control signals, and inertial measurement units (IMU). Each of the IMUs is configured to provide attitude information to a corresponding one of the propulsion controllers. In this way, there is one propulsion controller for each of the propulsion units and one IMU for each of the propulsion controllers. When there is a failure at the control unit, each of the propulsion control unit units are configured automatically generate the commands and control the propulsion units in order to attempt to stabilize the aerial vehicle.

20 Claims, 11 Drawing Sheets

(56) References Cited

U.S. PATENT DOCUMENTS

| | | | |
|---|---|---|---|
| 9,938,001 B1* | 4/2018 | Parent | B64C 39/024 |
| 9,944,404 B1* | 4/2018 | Gentry | G01M 17/00 |
| 2015/0344134 A1* | 12/2015 | Cruz Ayoroa | B64C 39/12 |
| | | | 244/48 |
| 2016/0347462 A1* | 12/2016 | Clark | B64D 17/62 |
| 2017/0106978 A1 | 4/2017 | Sopper et al. | |
| 2017/0106986 A1 | 4/2017 | Sweeny et al. | |
| 2017/0285664 A1* | 10/2017 | Wang | B64D 45/00 |
| 2018/0370629 A1* | 12/2018 | Finlay | B64C 39/024 |
| 2019/0004512 A1* | 1/2019 | Liu | G06T 7/0002 |
| 2019/0061944 A1* | 2/2019 | Zvara | B64D 9/00 |
| 2019/0144114 A1* | 5/2019 | Chen | G07C 5/06 |
| | | | 701/2 |
| 2019/0324449 A1* | 10/2019 | Wang | G01C 11/02 |
| 2019/0384288 A1* | 12/2019 | Gu | B64D 31/12 |
| 2020/0133097 A1* | 4/2020 | Honjo | G02B 7/102 |

FOREIGN PATENT DOCUMENTS

| | | |
|---|---|---|
| WO | 2017197316 A1 | 11/2017 |
| WO | 2018004681 A1 | 1/2018 |
| WO | 2018010097 A1 | 1/2018 |

* cited by examiner

UNMANNED AERIAL VEHICLE WITH DECENTRALIZED CONTROL SYSTEM

BACKGROUND

In a typical control system for a UAV, a control unit communicates with a centrally located inertial measurement unit (IMU) which passes pitch, yaw, and roll information (attitude) through a filter and thereafter to a control mixer. The output as well as signals from the control unit are passed via a bus, such as a CAN bus, to one or more propulsion controllers which together output a control signal to control operation of the UAV's a propulsion units. As an example, these propulsion units may each include a motor, shaft, and propeller. In addition, a power system, including a pair of batteries, may also be centrally located in order to provide power to the various features of the control system and propulsion units. With such a configuration, there can be many individual points of failure: the IMU can fail, the CAN bus can fail, the propulsion controllers can fail, and one or both batteries can fail. As a result of any such failures, there may be a loss of control of the UAV which can result in uncontrolled flight patterns or maneuvers, stalls, crashes, damage to the UAV, and so on.

BRIEF SUMMARY

Aspects of the present disclosure provide an aerial vehicle. The aerial vehicle includes a control unit configured to send control signals in order to control flight of the aerial vehicle; a plurality of propulsion units configured to control attitude of the aerial vehicle; a plurality of propulsion controllers configured to send commands to a corresponding propulsion unit of the plurality of propulsion units based on the control signals such that there is one propulsion controller of the plurality of propulsion controllers for each propulsion unit of the plurality of propulsion units; and a plurality of inertial measurement units (IMU), each IMU of the plurality of IMUs being configured to provide attitude information to a corresponding one of the plurality of propulsion controllers such that there is one IMU of the plurality of IMUs for each of the plurality of propulsion controllers, wherein when there is a failure at the control unit, each of the plurality of propulsion controllers are configured to automatically generate the commands and control the plurality of propulsion units in order to attempt to stabilize the aerial vehicle.

In one example, each of the plurality of propulsion units includes a motor, and a corresponding one of the plurality of IMUs is attached to a given motor of the plurality of propulsion units. In this example, the corresponding one of the plurality of IMUs for a particular given motor of the plurality of propulsion units is configured to provide the corresponding one of the plurality of propulsion controllers for the corresponding one of the plurality of IMUs with measurements corresponding to a relative orientation of the particular given motor. In another example, the each of the plurality of propulsion controllers are configured to, after stabilizing the aerial vehicle, automatically generate the commands and control the plurality of propulsion units in order to allow the aerial vehicle to move to a predetermined position. In another example, each of the plurality of propulsion controllers are configured to identify the failure based on an error message from the control unit. In another example, each of the plurality of propulsion controllers are configured to identify the failure based on a lack of information received from the control unit during a predetermined amount of time. In another example, each of the plurality of propulsion controllers are configured to identify the failure based on data received from the control unit and information stored locally in memory of each of the plurality of propulsion controllers. In this example, the failure includes a particular maneuver corresponding to a particular change in angular acceleration of the aerial vehicle defined in the information stored locally in memory of each of the propulsion controllers. As an alternative, the failure corresponds to a particular maneuver corresponding to a particular change in linear acceleration of the aerial vehicle defined in the information stored locally in memory of each of the plurality of propulsion controllers. As another alternatively, the failure corresponds to a particular maneuver corresponding to a particular change in relative orientation of the aerial vehicle defined in the information stored locally in memory of each of the plurality of propulsion controllers. As another alternative, the data includes instructions to cause the aerial vehicle perform a particular combination of maneuvers defined in the information stored locally in memory of each of the plurality of propulsion controllers. In another example, the aerial vehicle also includes a bus configured to provide a communication link between the control unit and the plurality of propulsion controllers, wherein when the failure is not at the bus, the propulsion controllers of the plurality of propulsion controllers may communicate with one another in order to attempt to stabilize the aerial vehicle. In this example, each given propulsion controller of the plurality of propulsion controllers is configured to send attitude information from the IMU of the given propulsion controller with each other propulsion controller of the plurality of propulsion controllers in order to attempt to stabilize the aerial vehicle. In addition, each given propulsion controller of the plurality of propulsion controllers is configured to identify a failed IMU of the plurality of IMUs and ignore the attitude information from the failed IMU. In another example, the aerial vehicle also includes a bus configured to provide a communication link between the control unit and the plurality of propulsion controllers, wherein when the failure is at the bus, the propulsion controllers of the plurality of propulsion controllers are configured to attempt to stabilize the aerial vehicle without using information from other of the plurality of propulsion controllers. In another example, each of the plurality of propulsion controllers is configured to attempt to stabilize the aerial vehicle by achieving a predetermined attitude. In another example, the aerial vehicle also includes a plurality of batteries, each battery of the plurality of batteries being configured to power a corresponding one of the plurality of propulsion controllers and a plurality of switches configured to connect and disconnect the plurality of batteries from each of the plurality of propulsion controllers when a failure of one of the plurality of batteries occurs. In this example, the aerial vehicle also includes a plurality of sensors configured to provide sensor feedback for each of the plurality of batteries, and wherein the control unit is further configured to control states of the plurality of switches based on the sensor feedback. In addition or alternatively, the aerial vehicle also includes a plurality of sensors configured to provide sensor feedback for each of the plurality of batteries and for each of the plurality of switches, a dedicated switch controller configured to control states of at least one of the plurality of switches based on the sensor feedback. In addition or alternatively, the plurality of switches includes at least one transistor switch.

DETAILED DESCRIPTION

Figure 1A:
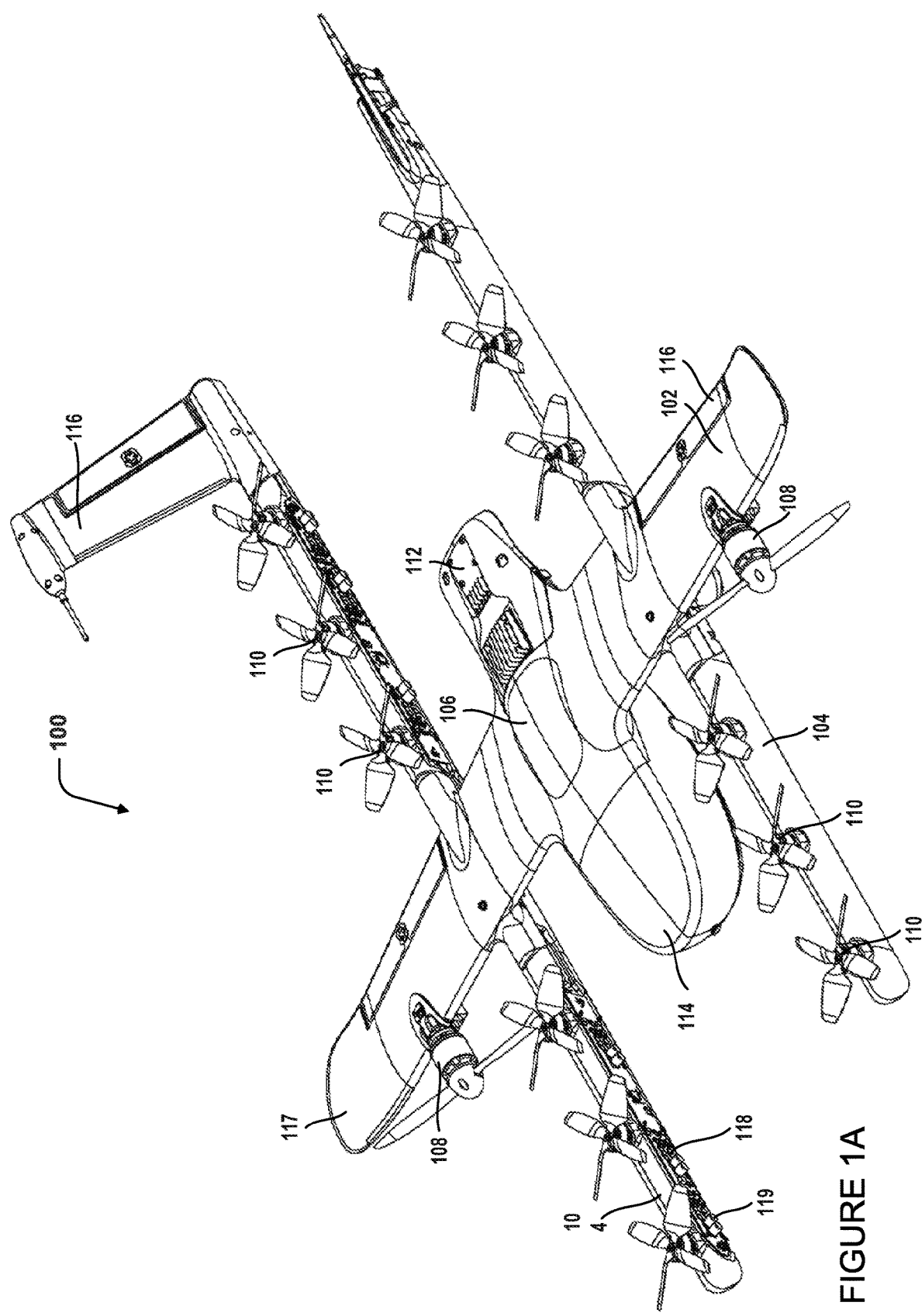
FIGS. 1A-1E are examples of UAVs in accordance with aspects of the present disclosure.

The technology relates to decentralized control and battery systems for aerial vehicles and in particular, unmanned aerial vehicles (UAVs). In order to mitigate potential dangerous situations caused by failures at a centralized control system, the control system may be reconfigured to a decentralized configuration. For instance, the IMU may be moved from the center of the UAV and replicated it at each of the propulsion or speed controllers, so if the control unit, one or more IMU, or any parts of the control system fail, the UAV will not drastically shut down. Rather, this new configuration may allow the UAV to follow a more gradual descent.

For instance, each propulsion or speed controller may be an electronic speed control (ESC) or any type of controller that controls speed electronically including electromechanical speed controllers. Each propulsion controller t may have a corresponding IMU. Ideally, each IMU may be arranged in the same plane as or parallel to a motor of the propulsion unit controlled by the propulsion controller for its corresponding IMU. As such, the IMU may provide pitch, yaw and roll information, which may be used to calculate the attitude of the IMU. This information may then be provided to the corresponding propulsion controller. As such, each propulsion controller is "aware" of the attitude of its corresponding propulsion unit (or rather motor of the corresponding propulsion unit) and can use this information when controlling the propulsion units. Of course, the number and exact placement of each IMU and each propulsion controller may be different for different physical configurations of UAV.

The UAV may still be subject to failures. These failures may be arranged in a failure table which identifies certain incoming signals as a failure. Such tables may be stored locally at each propulsion controller for reliable and efficient retrieval and comparison of incoming signals. Once a failure is identified, the propulsion controllers may be able to automatically stabilize the aircraft. For instance, using the information of the corresponding IMU, an propulsion controller may control its corresponding propulsion unit in order to stabilize the UAV or move the UAV to a particular attitude. At the same time, the other propulsion controllers may use the corresponding IMUs to attempt to achieve the same result. Once a desired attitude is reached or achieved, the propulsion controllers may also be programed to then control the UAV to descend to the ground.

By arranging each IMU parallel to or in the same plane as the motor of the corresponding propulsion unit of the propulsion controller for that IMU, the propulsion controller may be able to determine whether the propulsion unit is completely broken or out of position. For instance, if the propulsion controller is unable to effect a change the attitude of the UAV by controlling the propulsion unit over some period of time, this may be because the propulsion unit is completely broken. As another instance, if the propulsion controller is able to effect a change in the attitude of the UAV, but only to a certain extent over some period of time, this may be because the propulsion unit is functional, but out of position relative to the UAV.

In addition or as an alternative to the decentralized control system discussed above, in order to mitigate potential dangerous situations caused by failures at the power system, the power system may be reconfigured to a decentralized configuration. For instance, rather than two larger batteries, smaller batteries may be distributed around the UAV, e.g. one proximate to each propulsion controller. Each of these batteries may also be wired to power a particular propulsion controller. In addition, these batteries may also be wired to power the corresponding IMU and corresponding propulsion unit for that particular propulsion controller. Such a configuration may allow for greater redundancy, lower battery discharge rates, lower the need for battery cooling, and smaller wires (or wires of a smaller gauge), but may require more wires to connect more batteries to different points on the UAV.

A plurality of switches may be used to connect and disconnect each battery with each propulsion controller. The state of these switches may be controlled by one or more dedicated switch controllers or the control unit based on sensor feedback, such as voltage, temperature, and other information. This sensor feedback may be sent directly to the control unit or one or more dedicated switch controllers, or may be processed by the propulsion controllers individually and the state of each corresponding battery reported back to the control unit or one or more dedicated switch controllers.

In this regard, in response to sensor feedback indicative of a battery failure, reduced voltage output, an expected failure, or a negative report from one of the ESC units or no reports from one of the ESC units over some period of time, the control unit or one or more dedicated switch controllers may configure and reconfigure the switches in order to disconnect a battery and connect the corresponding propulsion controller for that battery to a different battery or batteries. Thus, if one of the batteries fails or is projected to fail, the UAV may automatically reconfigure how power from the remaining batteries is supplied to the propulsion controllers.

The features described herein may be used to mitigate potential dangerous situations caused by failures of a control system, even where those failures occur at more than one point in the control system. In addition, the IMU redundancies allow for the propulsion controllers to stabilize a UAV even where both the controller and one or more of the IMUs fail and/or where there is a CAN bus failure. Similarly, the features described herein may be used to mitigate potential dangerous situations caused by failures of a battery of a power system by allow the UAV to automatically reroute power to the propulsion controllers, thereby allowing the UAV to function more efficiently and safely, even where there is a battery failure. In addition, a distributed power system as described above may allow for greater redundancy. It may also result in a lower cost to replace individual batteries as smaller batteries are typically less costly to replace than larger batteries,. Other benefits may include lower battery discharge rates, lower the need for battery cooling, and smaller wires.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling a payload or package. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106. In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. In addition, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, hook and loop fasteners etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
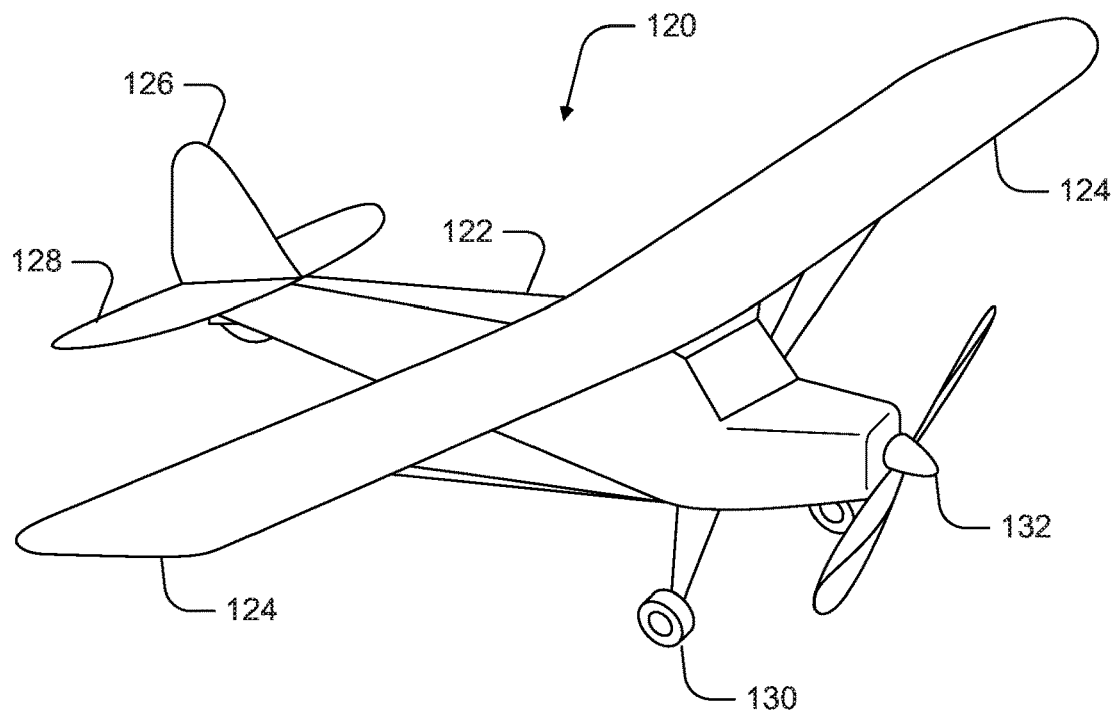

Similarly, FIG. 1B shows another example of a UAV 120. The UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
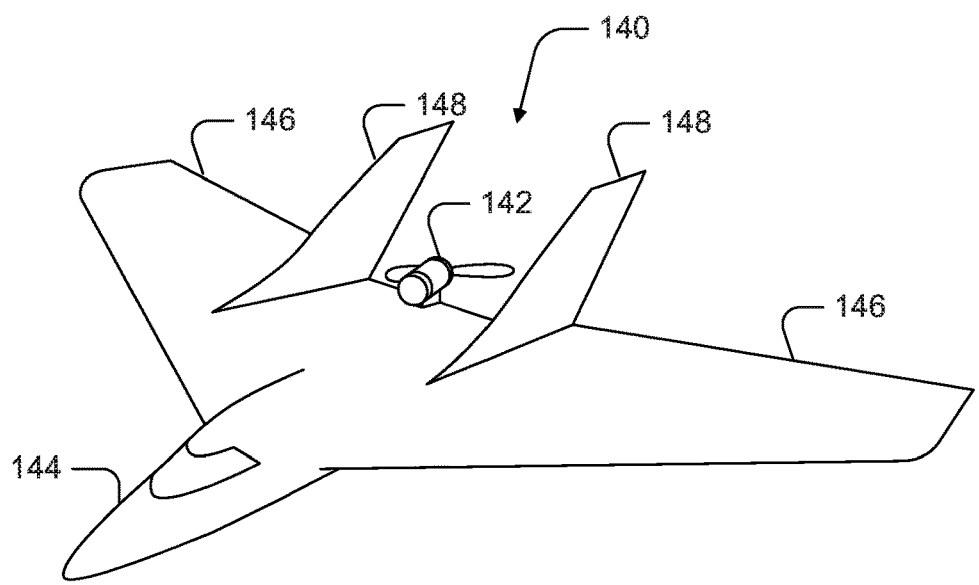

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
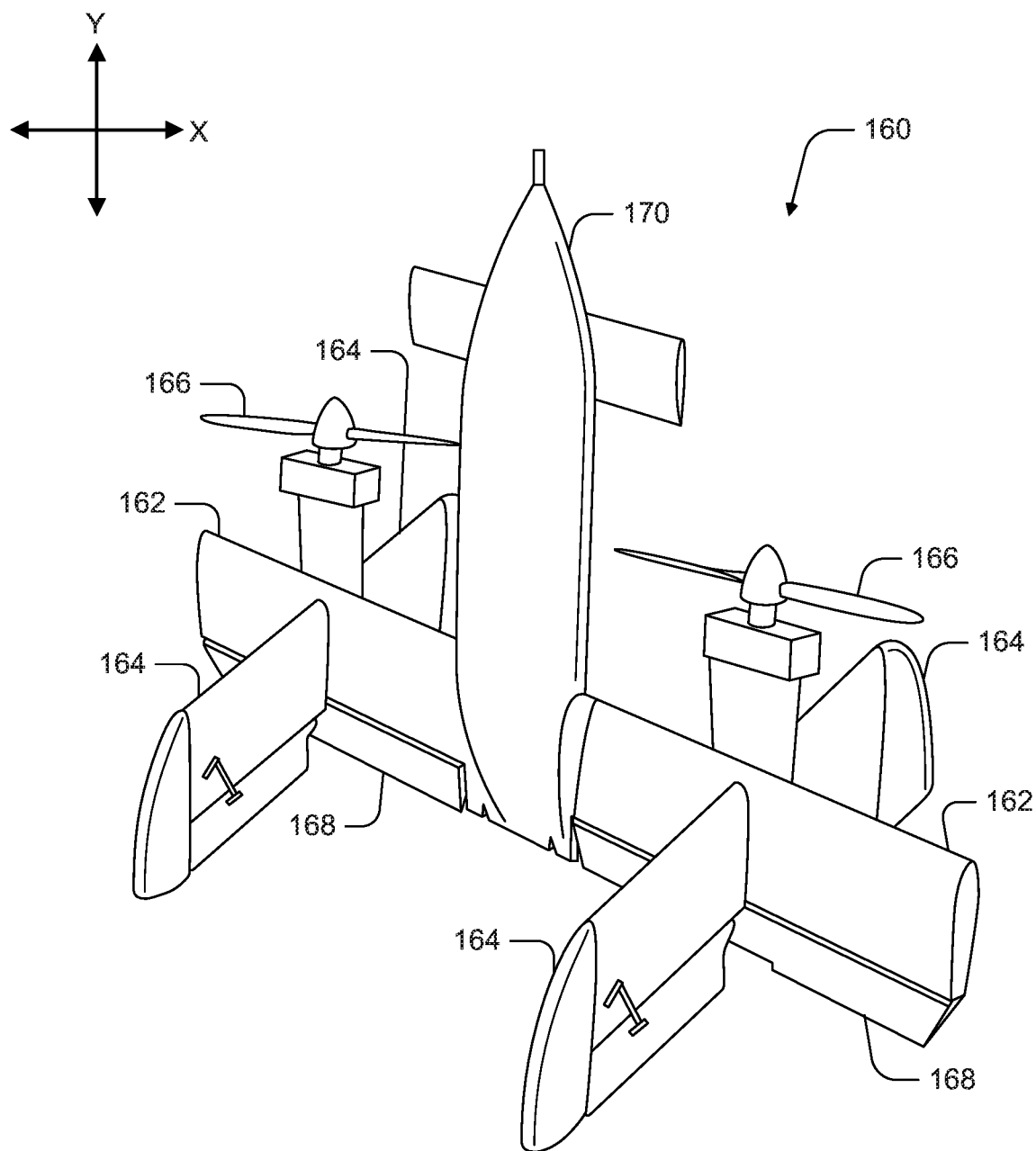

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own. For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Figure 1E:
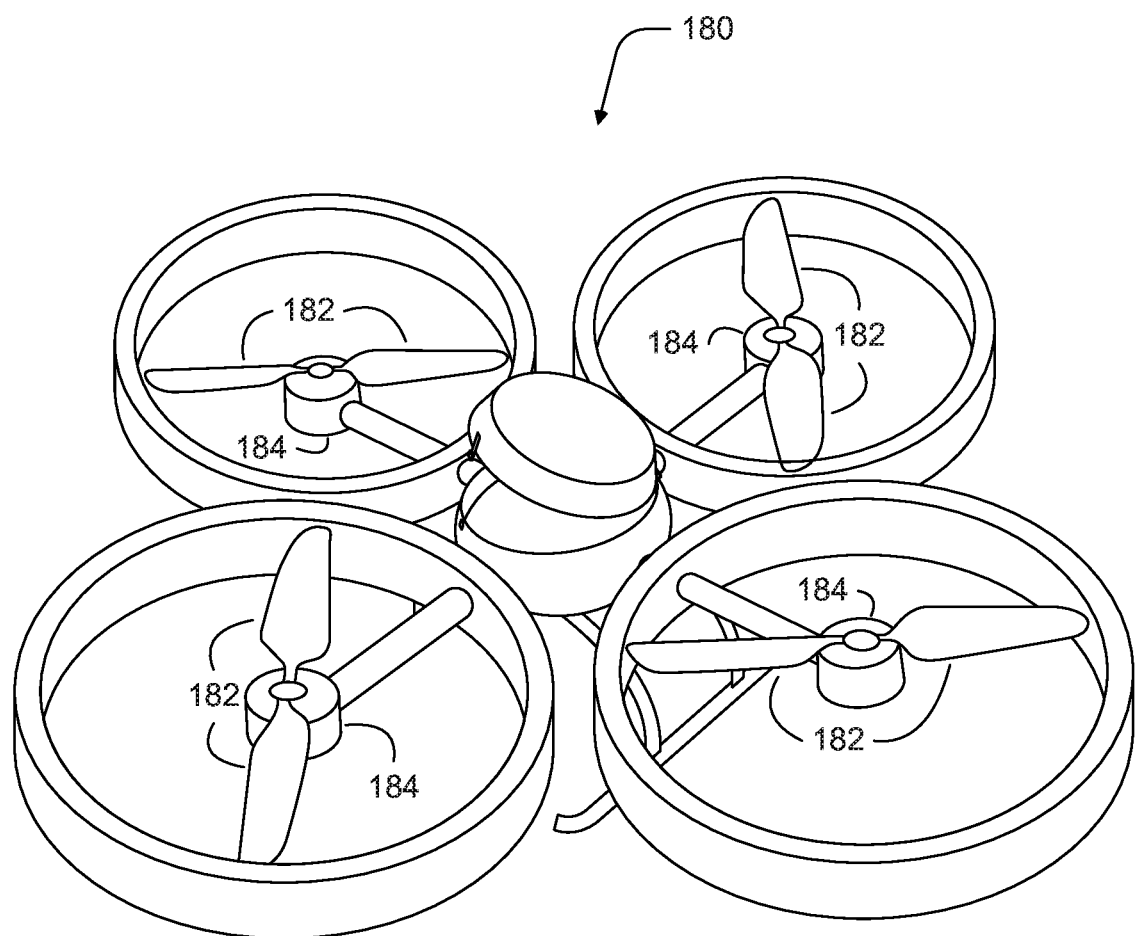

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible. As noted above, some embodiments may involve other types of UAVs, in addition to or in the alternative to fixed-wing UAVs. For instance, FIG. 1E shows an example of a rotorcraft that is commonly referred to as a multicopter UAV 180. The UAV 180 may also be referred to as a quadcopter, as it includes four rotors 182. It should be understood that example embodiments may involve a rotorcraft with more or fewer rotors than the UAV 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the UAV 180 in greater detail, the four rotors 182 provide propulsion and maneuverability for the UAV 180. More specifically, each rotor 182 includes blades that are attached to a motor 184. Configured as such, the rotors 182 may allow the UAV 180 to take off and land vertically, to maneuver in any direction, and/or to hover. Further, the pitch of the blades may be adjusted as a group and/or differentially, and may allow the UAV 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the various UAVs described herein are not intended to be limiting. Example embodiments may relate to, be implemented within, or take the form of any type of unmanned aerial vehicle.

Figure 2:
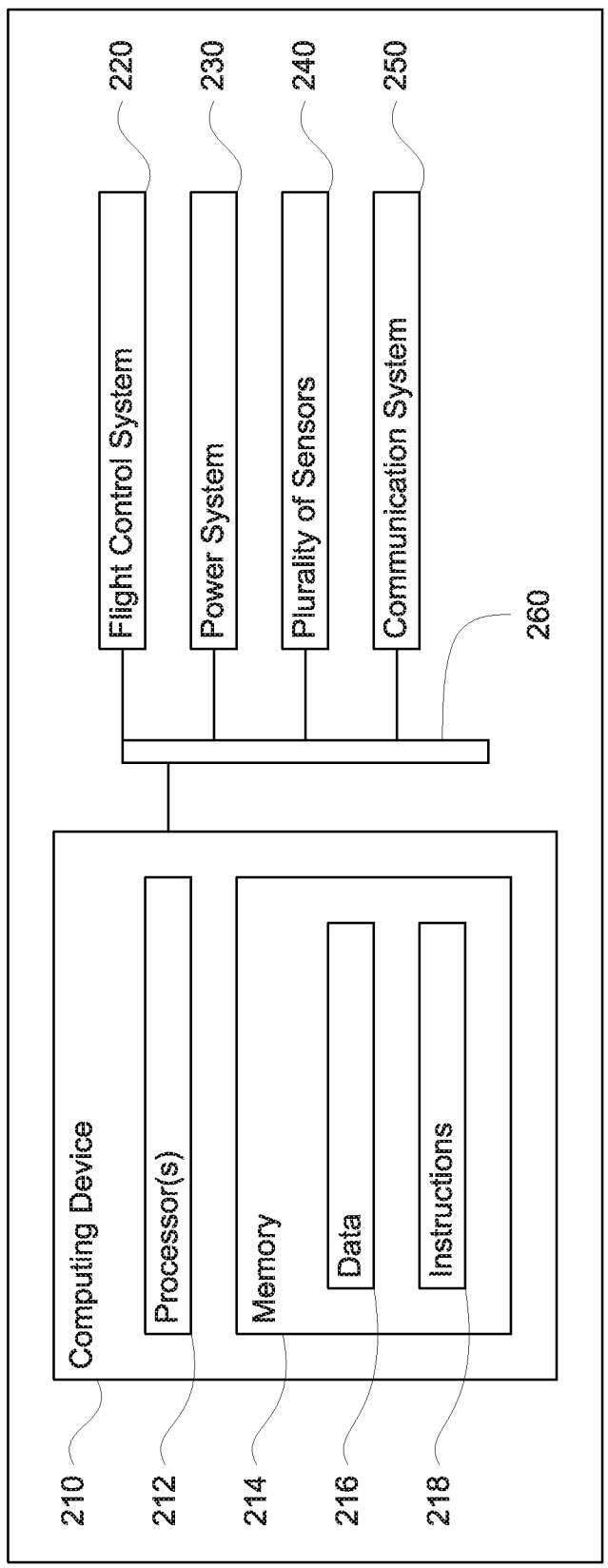
FIG. 2 is an example functional diagram of a UAV in accordance with aspects of the disclosure.

FIG. 2 is an example functional diagram of a UAV 200 which may correspond to any of the UAVs of a fleet of UAVs, including any of UAVs 100, 120, 140, 160, 180. In this example, the UAV 200 includes one or more computing devices 210 including one or more processors 212 and memory 214 storing data 216 and instructions 218. In addition, the UAV 200 includes a flight control system 220, a power system 230, a plurality of sensors 240, and a communication system 250 these systems are each connected to the computing devices 210 via a central networking system or bus such as a controller area network (CAN bus) 260. In some instances, the central networking system may include one or both of a wireless or optical communications features.

Computing devices 210 include one or more processors 212, memory 214, and other components typically present in general purpose computing devices. The memory 214 stores information accessible by the processor 212, including data 216 and instructions 218 that may be executed or otherwise used by the processor 212. The memory 214 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 216 may be any set of instructions to be executed directly (such as machine code) or indirectly (such as scripts) by the processor. For example, the instructions may be stored as computing devices code on the computing device-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 218 may be retrieved, stored or modified by processor 212 in accordance with the instructions 216. For instance, although the claimed subject matter is not limited by any particular data structure, the data may be stored in computing devices registers, in a relational database as a table having a plurality of different fields and records, XML documents or flat files. The data may also be formatted in any computing device-readable format.

The processor 212 may be any conventional processors, such as commercially available CPUs. Alternatively, the one or more processors may be a dedicated device such as an ASIC or other hardware-based processor. Although FIG. 2 functionally illustrates the processor(s), memory, and other elements of computing devices 210 as being within the same block, it will be understood that the processor(s), computing device, or memory may actually include multiple processors, computing devices, or memories that may or may not be stored within the same physical housing. For example, memory may be a hard drive or other storage media located in a housing different from that of computing devices 210. Accordingly, references to a processor or computing devices will be understood to include references to a collection of processors or computing devices or memories that may or may not operate in parallel.

For any of the aforementioned example configurations of UAVs, each of the features of the motors, shafts, propellers, rotors, flaps, etc. may all be part of the flight control system 220. In addition, the flight control system 220 may include a plurality of propulsion or speed controllers. These propulsion or speed controllers may include electronic speed control (ESC) units or any other type of controller that controls speed electronically including electromechanical speed controllersESC units, the features and benefits described herein may apply to systems and UAVs that employ such other types of controllers. The flight control system 220 may also include a plurality of IMUs. Operation of the flight control system 220 may be controlled by the computing devices 210 in order to maneuver the UAV 200, for instance, by controlling the altitude, pitch, speed, direction, etc. of the UAV.

Figure 3:
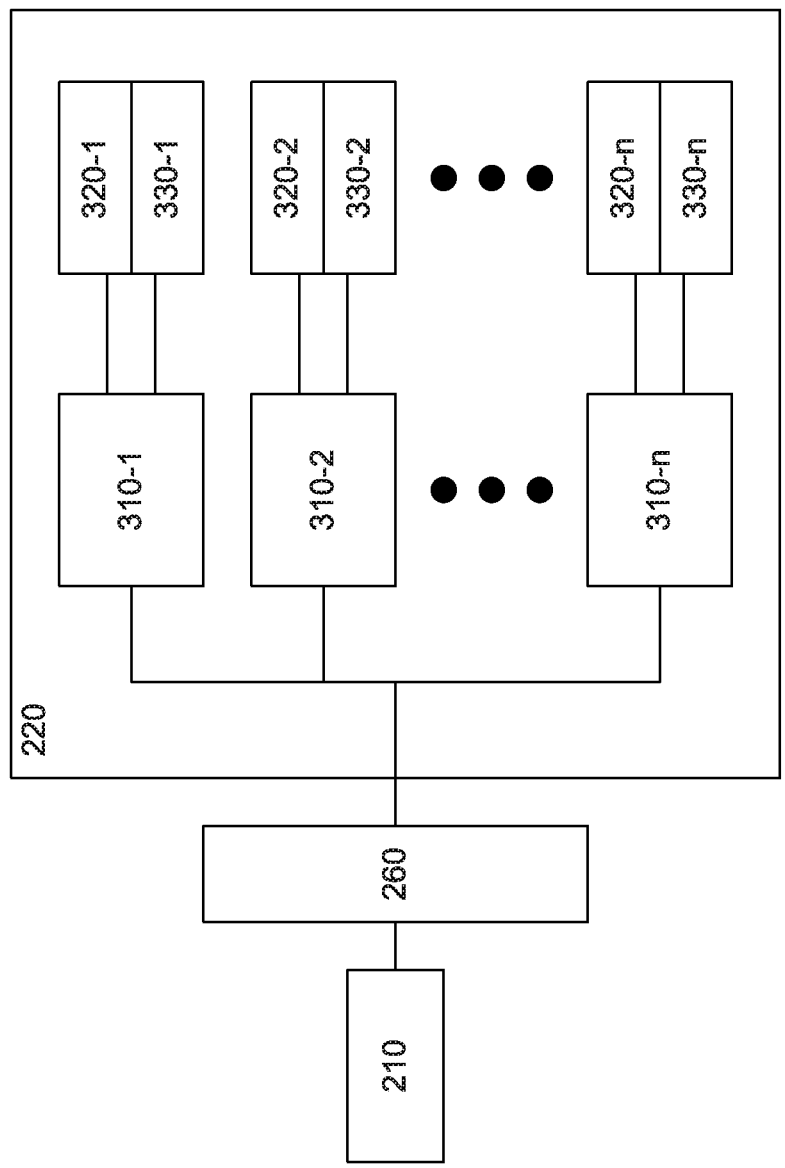
FIG. 3 is an example functional diagram in accordance with aspects of the disclosure.

As noted above, the flight control system 220 may be configured to a decentralized configuration. As shown in the example functional diagram 300 of FIG. 3, each ESC unit 310, represented by ESC unit 310-1, 310-2, 310-n, of the flight control system 220 may communicate with the computing devices 210 via the CAN bus 260. In addition, each of the ESC units has a corresponding IMU 320, represented by IMU 320-1, 320-2, 320-n, which is attached or adjacent to a corresponding propulsion unit 330, represented by propulsion units 330-1, 330-2, 330n. These propulsion units may include one or more motors connected to one or more shafts, propellers, rotors, flaps, etc. of the UAV 200. In this example, ESC unit 310-1 is arranged to control propulsion unit 330-1 using information from IMU 320-1, ESC unit 310-2 is arranged to control propulsion unit 330-2 using information from IMU 320-2, and ESC unit 310-3 is arranged to control propulsion unit 330-3 using information from IMU 320-3. In this example, n represents an integer value representative of the total number of ESCs, IMU, and motors of the UAV 200. Thus, although only three ESC, IMU and propulsion units are depicted in the example of FIG. 3, any number of additional ESC, IMU and propulsion units, such as 2, 4, 10, etc., may be used in the UAV 200 in the configuration depicted in the functional diagram 300.

Each IMU may be arranged in the same plane as or parallel to a corresponding motor of the propulsion unit controlled by the ESC for its corresponding IMU. For instance, IMU 320-1 may be directly attached or simply arranged adjacent to its corresponding propulsion unit 330-1, IMU 320-2 may be directly attached or simply arranged adjacent to its corresponding propulsion unit 330-2, and IMU 320-n may be directly attached or simply arranged adjacent to its corresponding propulsion unit 330-n. Each of the IMU may provide pitch, yaw and roll information for its corresponding motor, which again may be passed through a filter, such as a particle filter or a Kalman filter, and control mixer in order to calculate the attitude of the IMU. This information may then be provided to the corresponding ESC unit. As such, each ESC unit is "aware" of the attitude of its corresponding motor and can use this information when controlling the propulsion units. Again, the number and exact placement of each IMU and each ESC unit may be different for different physical configurations of UAV.

Each ESC unit 310 unit may also include one or more processors and memory, configured similarly to processors 212 and memory 214. As an example, memory of each ESC unit 310 may store various information including data and instructions for converting instructions in signals received from the computing devices 210 into commands and corresponding signals for a corresponding propulsion unit and/or motor of the propulsion unit, a predetermined position, orientation or attitude (as discussed further below), as well as failure information or failures. These failures may be arranged in a failure table which identifies certain incoming signals (or lack thereof for some period of time) as a failure. Such tables may be stored locally at each ESC unit for reliable and efficient retrieval and comparison of incoming signals (or lack therefore). As an example, these failures may include error messages being sent from the computing devices 210 to the ESC units, the computing devices 210 stops sending signals to the ESCs (such as where the is a complete failure of the computing devices 210 or for any other reason) for some period of time (such as 1 second or more or less), the computing devices 210 sends "bad" signals (i.e. signals which would result in dangerous maneuvers, accelerations, etc. As an example of a bad signal may include a signal that indicates that the propulsion units may not be able to reliably perform safely, such as going forward at an angle of more than 45 degrees or more or less, increasing angular acceleration at a rate of more than 5 radians per second or more or less, tilting at more than 45 degrees or more or less, accelerating linearly at no more than some predetermined rate, accelerating an individual propulsion unit at more than some predetermined rate relative to other propulsion units (which could cause the drone to become unstable or flip over), or particular combinations or patterns of unwanted or unsafe maneuvers over a predetermined period of time.

The power system 230 may include a plurality of batteries which can provide current to a motor of a propulsion unit in order to rotate a shaft for a propeller or pivot one or more flaps of the propulsion units as well as power the IMUs, ESC units, computing devices 210, and other features of the UAV 200. Of course, having a plurality of two or more batteries may be useful in the event of an unexpected failure of one battery or to be able to increase the power to the motors 330 for short periods of time in order to accomplish the aforementioned flying maneuvers.

In addition or as an alternative to the decentralized control system discussed above, in order to mitigate potential dangerous situations caused by failures at the power system, the power system may be reconfigured to a decentralized configuration. For instance, rather than two larger batteries, multiple smaller batteries may be distributed around the UAV, one proximate to each ESC unit, IMU, and/or propulsion unit. Thus, each battery has a corresponding ESC unit, IMU and propulsion unit.

Figure 4A:
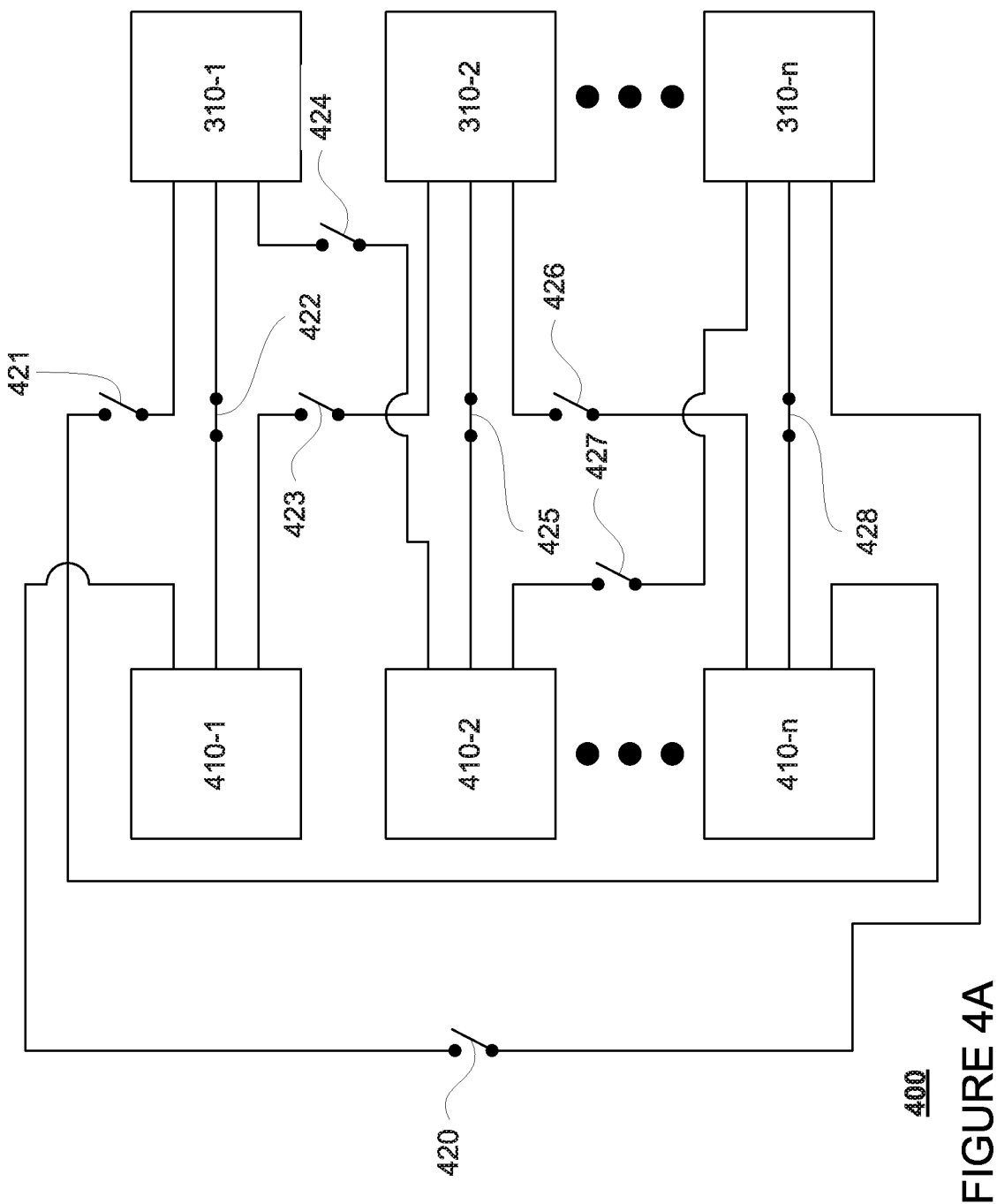
FIGS. 4A-4C is an example functional diagram in accordance with aspects of the disclosure.

FIG. 4A is an example functional diagram 400 representing the configuration of batteries 410, ESC units 310, and a plurality of switches 420-428. As shown, each of these batteries may also be wired to power a corresponding ESC unit. For instance, as shown in FIG. 4A, battery 410-1 is configured to power ESC unit 310-1 via switch 424, battery 410-2 is configured to power ESC unit 310-2 via switch 426, and battery 410-n is configured to power ESC unit 310-n via switch 428. Such a configuration may allow for greater redundancy (allowing for more than one battery failure), lower battery discharge rates (as each battery is required to supply less power), lower the need for battery cooling (as smaller batteries may produce less heat and may have greater surface area to volume ratio in order to more effectively dissipate heat), and smaller wires (or wires of a smaller gauge). Of course, as the number of ESC units increases, so will the number of batteries, switches and wires required to connect such batteries to different points on the UAV.

As noted above, the plurality of switches may be used to connect and disconnect each battery with each ESC unit (and/or corresponding IMU and corresponding motor). For instance, by changing the state of the switches 420-428, each of the batteries 410 may be connected or disconnected from each of the ESC units 310. As an example, referring to the states depicted in FIG. 4A, by opening switch 422, the battery 410-1 may be disconnected from ESC unit 310-1; by opening switch 425, the battery 410-2 may be disconnected from ESC unit 310-2; and by opening switch 428, the battery 410-n may be disconnected from ESC unit 310-n. Similarly, by closing switch 420, the battery 410-1 may be connected to ESC unit 310-n in order to provide power to ESC unit 310-n; by closing switch 421, the battery 410-n may be connected to ESC unit 310-1 in order to provide power to ESC unit 310-1; by closing switch 423, the battery 410-1 may be connected to ESC unit 310-2 in order to provide power to ESC unit 310-2; by closing switch 424, the battery 410-2 may be connected to ESC unit 310-1 in order to provide power to ESC unit 310-1; by closing switch 426, the battery 410-n may be connected to ESC unit 310-2 in order to provide power to ESC unit 310-2; and by closing switch 427, the battery 410-2 may be connected to ESC unit 310-n in order to provide power to ESC unit 310-n; and.

The plurality of switches 420-428 may include physical relays, switches including transistor switches such as metal-oxide-semiconductor field-effect transistor (MOSFET) switches, solid state switches, etc. The state of these switches may thus be controlled by one or more dedicated switch controllers or the computing devices 210 based on sensor feedback, such as voltage, temperature, and other information regarding the state of the batteries 410, ESC units 310 (or IMUs 320 or motors 330 as in the examples of FIGS. 4B and 4C discussed below), etc. provided by the sensors of the plurality of sensors 240 discussed further below. This sensor feedback may be sent directly to the control unit or one or more dedicated switch controllers, or may be processed by the ESC units 310 individually and the state of each corresponding battery 410 reported back to the computing devices 210 and, in addition or alternatively, to the one or more dedicated switch controllers in order to control the state of the switches 420-428.

Figure 4B:
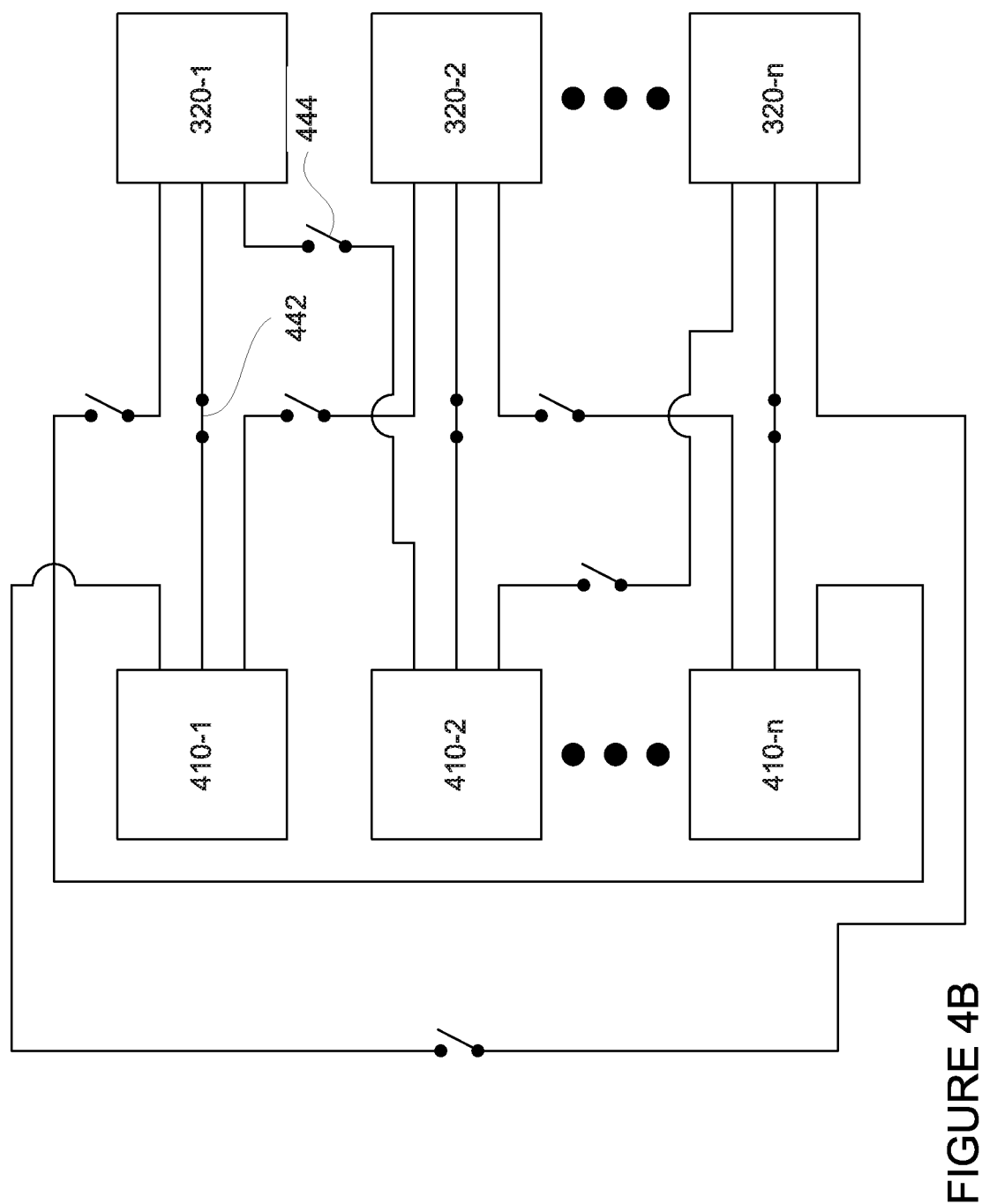
Figure 4C:
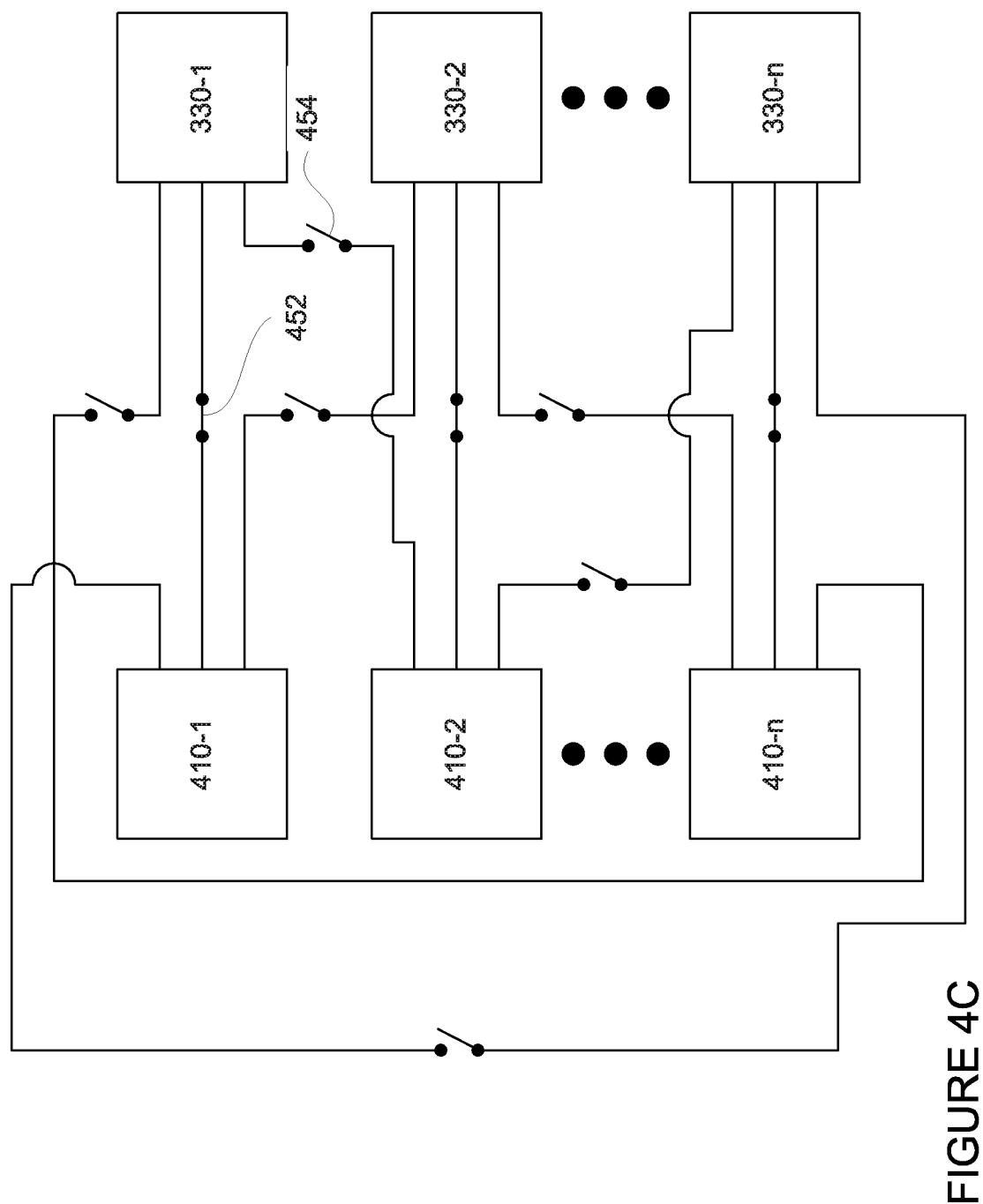

In addition, these batteries may also be wired to power the corresponding IMU and motor for each ESC. For simplicity of representation, the IMUs and motors are not shown in FIG. 4A, though for instruction, ESC units 310-1, 310-2, 310-n may be replaced by IMUs 320-1, 320-2, 320-n or propulsion units 330-1, 330-2, 330-n as shown in FIGS. 4B and 4C. Moreover, the switches of FIGS. 4B and 4C may function to disconnect or connect the various IMUs and propulsion units 330 as described above with respect to the switches 420-428 and ESC units 310-1, 310-2, 310-n. Thus, the three functional diagrams of FIGS. 4A, 4B, and 4C may be thus be combined to represent the wiring configurations of the batteries 410 with respect to each of the ESC units 310, IMU 320, and motors 330.

The plurality of sensors 240 may be located throughout the UAV 200 in order to generate data or sensor feedback from different locations and features of the UAV and forward this information to the computing devices 210. In this regard, sensor feedback may refer to "raw sensor data" or data processed by the sensor or computing devices 210. For instance, each battery of the power system 230 may include a plurality of sensors configured to detect the current, voltage, temperature, and state of charge of each cell of that battery. The plurality of sensors 240 may also include sensors such as LIDAR, sonar, radar, cameras (still and/or video) which may include, e.g., optical or infrared imaging devices, an altimeter, an accelerometer, a gyroscope, a GPS receiver, a humidity sensor, a speedometer, a wind speed sensor, propeller speed sensors (relative and absolute), etc. in order to enable the UAV to safely maneuver itself. Thus, sensor feedback may include information generated by all or any of the plurality of sensors 240.

The computing devices 210 may be configured to function as a control unit in order to control the operation of the various systems of the UAV 200 in order to function as described herein. For instance, the computing devices 210 may use the data and instructions of memory 214 as well as feedback from some of the sensors to control the features of the flight control system 220 and power system 230 in order to follow a flight plan and complete a mission, for instance, deliver a package. In this regard, the instructions may allow the UAV 200 to operate autonomously or semi-autonomously using aerial maps and mission information stored the data of memory 214.

The communication system 250 may include for instance, a network interface device, such as a transmitter and/or receiver which enables the UAV to communicate with other computing devices.

Figure 5:
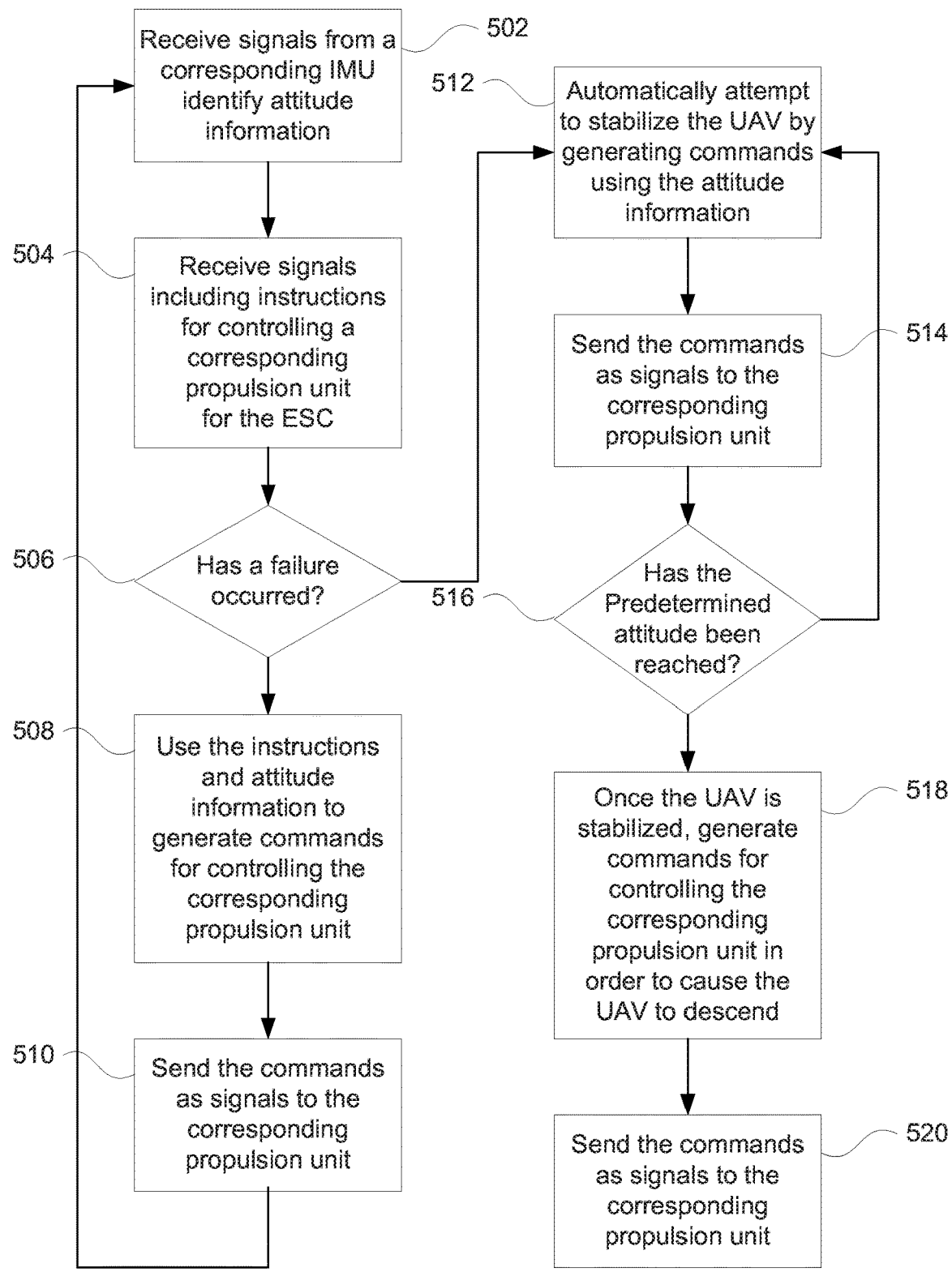
FIG. 5 is an example flow diagram in accordance with aspects of the disclosure.

FIG. 5 is an example flow diagram 500 of aspects of the disclosure. The operations of the blocks may be performed by a propulsion controller, such as any of ESC units 310-1, 310-2, or 310-n. For simplicity, the examples below relate to ESC unit 310-1 but could also relate to any of ESC units 310-2 or 310-n. In addition, various of the operations may be performed at the same time or in a different order.

Turning to block 502, during operation of a UAV, each ESC unit receives signals from the corresponding IMU for that ESC unit identifying attitude information for the corresponding motor of the corresponding propulsion unit. For instance, the ESC unit 310-1 also receives attitude information from the IMU 320-1. This attitude information may include pitch, yaw and roll information for the propulsion unit 330-1 and may be received periodically by the ESC unit 310-1, such as every 0.1 of a second or several times a second or more or less. In this regard, the attitude information may be received during the operations of any and all of the blocks of flow diagram 500.

At block 504, each USC unit of the UAV also receives signals including instructions for controlling the corresponding propulsion unit for that ESC unit. For instance, in UAV 200, ESC unit 310-1 may receive signals from the computing devices 210 containing instructions for controlling the corresponding propulsion unit 330-1.

At block 506, each ESC unit determines whether a failure has occurred. For instance, the one or more processors of ESC unit 310-1 may compare the instructions from any received signals and/or circumstances of a lack of received signals for a period of time to the information in the failure table to determine whether the instructions or circumstances match or correspond to the information in the failure table. If so, the one or more processors of the ESC unit 310-1 may identify a failure. If not, the one or more processors of the ESC unit 310-1 would not identify a failure.

If no failure is identified, the process proceeds to block 508 where each ESC unit uses the instructions and the attitude information to generate commands for controlling the corresponding propulsion. For instance, one or more processors of ESC unit 310-1 may use the attitude information from IMU 320-1 to generate commands for controlling the propulsion unit 330-1. The generated commands are then sent as signals by the ESC unit to the corresponding propulsion unit at block 510. In this regard, ESC unit 310-1 may send the commands as signals to the propulsion unit 330-1. This process may be repeated until by each ESC units until any of the ESC units identify a failure at block 506.

Returning to block 506, if a failure is identified, the ESC units automatically attempt to stabilize the UAV by generating commands using the attitude information in order to cause the UAV to reach a predetermined position, orientation or attitude as shown in block 512. For instance, using the information of the corresponding IMU, an ESC unit may automatically generate commands to control its corresponding propulsion unit in order to stabilize the UAV or move the UAV to the predetermined attitude. This predetermined attitude will be different for different physical configurations of the UAV.

The generated commands are then sent as signals by the ESC unit to the corresponding propulsion unit at block 514. Again, the ESC unit 310-1 may send the commands as signals to the propulsion unit 330-1. By doing so, the ESC unit may actually "level out" the UAV or bring the UAV to a zero, baseline, default or normalized orientation based on the physical configuration of the UAV. At the same time, the other ESC units that have also identified a failure may use their corresponding IMUs to attempt to achieve the same result.

As shown at block 516, blocks 512 and 518 may be repeated until the predetermined attitude is reached. For instance, the one or more processors of the ESC unit 310-1 may compare attitude information most recently received from the IMU 320-1 to the predetermined attitude to determine whether the predetermined attitude has been reached. Thus, the predetermined attitude may correspond to a preferred attitude for the entire UAV and/or a relative attitude for the corresponding motor (here ESC unit 330-1) for that ESC unit when the entire UAV is at the preferred attitude.

Once the predetermined attitude is reached or otherwise achieved, the ESC units then generate commands for controlling the corresponding propulsion unit to cause the UAV to descend to the ground as shown in block 518. The generated commands are then sent as signals by the ESC unit to the corresponding propulsion unit at block 520. Again, the ESC unit 310-1 may send the commands as signals to the propulsion unit 330-1. This may allow the UAV to mitigate potential dangerous situations caused by any of the aforementioned failures such as an out of control UAV which could potentially crash and cause damage to the UAV as well as other nearby objects.

In addition, where the failure is not at the CAN bus, the ESC units may communicate directly with one another via the CAN bus, sharing attitude information from the corresponding IMUs in order to more readily bring the UAV to a particular attitude. This may also allow the ESC units to determine which, if any, of the IMUs is reporting incorrect information and thereby disregard that information. Of course, if there is a CAN bus failure, the ESC units may also function to attempt to stabilize the UAV by controlling the corresponding propulsion units without information from the other UAVs making corrections based on the current information from the corresponding IMU for that ESC.

By arranging each ESC and corresponding IMU parallel to or in the same plane as the motor of the corresponding propulsion unit of the ESC unit for the corresponding IMU, the ESC may be able to determine whether the propulsion unit is completely broken or out of position (relative to the UAV). For instance, if an ESC unit is unable to effect a change the attitude of the UAV by controlling the corresponding propulsion unit over some period of time, this may be because the propulsion unit is completely broken (e.g. not responsive to commands from the ESC unit). As another instance, if the ESC unit is able to effect a change in the attitude of the UAV, but only to a certain extent over some period of time, this may be because the propulsion unit is functional, but out of position relative to the UAV.

Figure 6:
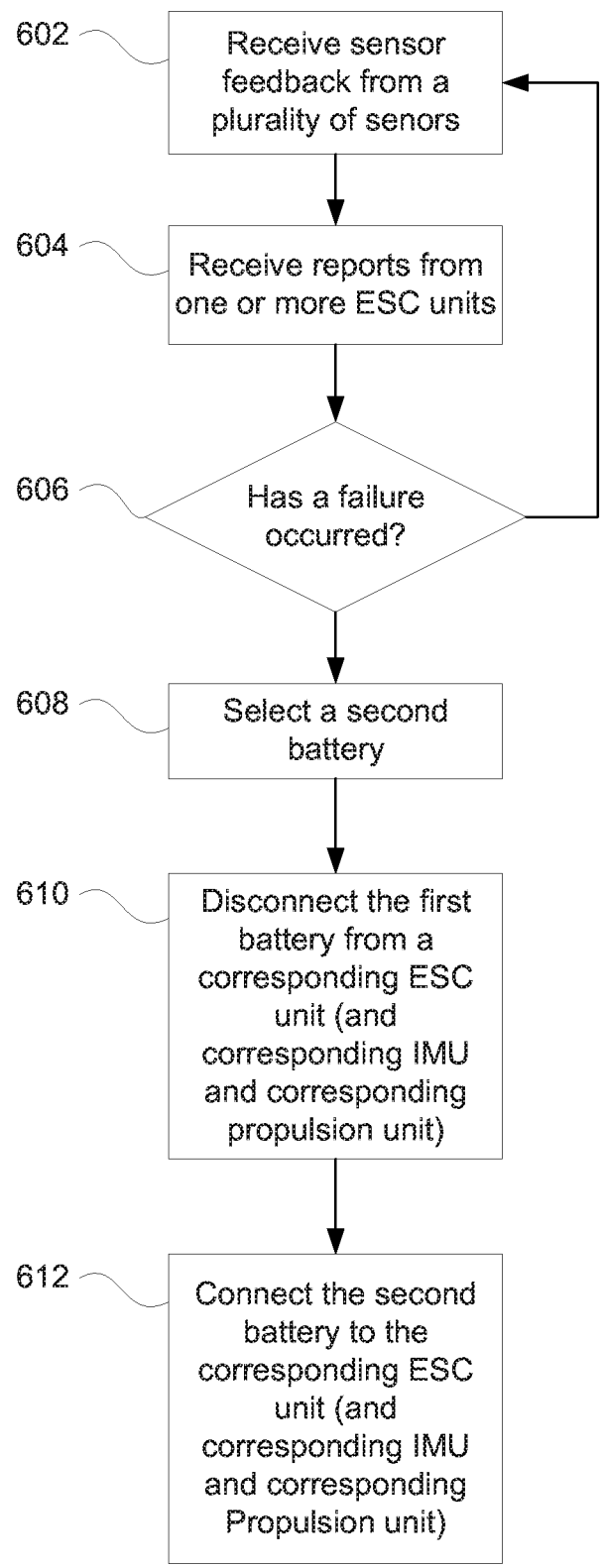
FIG. 6 is another example flow diagram in accordance with aspects of the disclosure.

FIG. 6 is an example flow diagram 600 of aspects of the disclosure. The operations of the blocks may be performed by one or more processors of one or more computing devices, such as the computing devices 110, or one or more dedicated switch controllers. In addition, various of the operations may be performed at the same time or in a different order.

Turning to block 602, during operation of the UAV, sensor feedback is received from a plurality of sensors. For instance, the sensor feedback may be generated by any of the plurality of sensors 240. This may include, for example, battery and/or cell temperatures, voltage or current outputs, etc. for each of a plurality of batteries of the power system 230 as well as information about the functionality of different features of the UAV such as propulsion controllers, motors, propellers, IMU, etc. The sensor feedback may be generated and received periodically, such as every 0.1 of a second or several times a second or more or less. In this regard, the sensor feedback may be received during the operations of any and all of the blocks of flow diagram 600.

At block 604, reports may be received from one or more ESC units. These reports may include information about the status of the ESC unit providing the report such as acknowledgement or functionality information as well as information about a status of a corresponding IMU for that ESC unit. Again, these reports may be generated and received periodically, such as every 0.1 of a second or several times a second or more or less. In this regard, the reports may be received during the operations of any and all of the blocks of flow diagram 600.

At block 606, the sensor feedback and/or reports are used to identify a failure or determine whether a failure has occurred or will occur. Such failures may include an actual failure or expected failure at a first battery (or rather any battery), of the plurality of batteries or if there is a failure at any of the devices powered by the first battery which could indicate a problem with the first battery or a need to disconnect any of those devices from a battery. As an example, such failures may include an actual or expected battery failure (such as reduced voltage, cell imbalance, high internal resistance, shorted or open cell, etc.), an actual or expected failure of a propulsion controller (such as failed mosfet, overheating, de-sync, a negative report from one of the propulsion controllers or no reports from one of the propulsion controllers over some period of time, for instance, where a propulsion controller is no longer receiving power), a motor or propeller (such as an overall software bugs/failure, frozen motor, bad bearings, etc.), an IMU, or other such actual or expected hardware or software failures that can be identified, for instance, using the sensor feedback. If no failure is identified, then blocks 602 and 604 are repeated continuously during operation of the UAV.

If a failure is identified at block 606, the process proceeds to block 608, at which a second battery is selected. For instance, a second battery may be selected based on the total capacity for that second battery and/or number of devices (motors, IMUs, ESC unites, etc.) needed to be powered by that second battery. For example, if the first battery is battery 410-1, the second battery may be battery 410-2 or 410-n.

At block 610, the first battery is operatively disconnected from a corresponding ESC unit, and in some cases, a corresponding IMU and a corresponding propulsion unit for that ESC unit. For instance, referring to FIG. 4A, the battery 410-1 may be disconnected from the corresponding ESC unit 310-1 by opening switch 422. Similarly, referring to FIGS. 4B and 4C, switches 442 and 452 may be opened in order to disconnect battery 410-1 from IMU 320-1 and propulsion unit 330-1, respectively.

At block 612, the second battery is operatively connected to the corresponding ESC unit, and in some cases, a corresponding IMU and a corresponding propulsion unit for that ESC unit. For instance, referring to FIG. 4A, the ESC unit 310-1 may be connected to battery 410-2 by closing switch 424. Similarly, referring to FIGS. 4B and 4C, switches 444 and 454 may be closed in order to connect battery 410-2 to IMU 320-1 and propulsion unit 330-1, respectively. In addition, these switches can be configured to connect and disconnect batteries when charging in order to allow for faster or more directed charging of certain batteries of the plurality of batteries.

As such, in response to sensor feedback from the plurality of sensors 240 indicative of a battery failure, reduced voltage output, or expected failure, or a negative report from one of the ESC units or no reports from one of the ESC units over some period of time (for instance, where the ESC unit is no longer receiving power), the computing devices 110 or the one or more dedicated switch controllers may change the state of the switches of the plurality of switches 420-428 in order to disconnect a battery from a corresponding ESC unit (and/or corresponding IMU and corresponding propulsion unit) and to connect that corresponding ESC unit to a different battery or batteries. Thus, if one of the batteries fail, the UAV may automatically reconfigure how power from the remaining batteries is supplied to the ESC units (and/or corresponding IMU and corresponding propulsion unit).

Unless expressly stated here, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An aerial vehicle comprising:
a control unit configured to send control signals in order to control flight of the aerial vehicle;
a plurality of propulsion units configured to control attitude of the aerial vehicle;
a plurality of propulsion controllers configured to send commands to a corresponding propulsion unit of the plurality of propulsion units based on the control signals such that there is one propulsion controller of the plurality of propulsion controllers for each propulsion unit of the plurality of propulsion units; and
a plurality of inertial measurement units (IMU), each IMU of the plurality of IMUs being configured to provide attitude information to a corresponding one of the plurality of propulsion controllers such that there is one IMU of the plurality of IMUs for each of the plurality of propulsion controllers, wherein when there is a failure at the control unit, each of the plurality of propulsion controllers are configured to automatically generate the commands and control the plurality of propulsion units in order to attempt to stabilize the aerial vehicle.

2. The aerial vehicle of claim 1, wherein each of the plurality of propulsion units includes a motor, and a corresponding one of the plurality of IMUs is attached to a given motor of the plurality of propulsion units.

3. The aerial vehicle of claim 2, wherein the corresponding one of the plurality of IMUs for a particular given motor of the plurality of propulsion units is configured to provide the corresponding one of the plurality of propulsion controllers for the corresponding one of the plurality of IMUs with measurements corresponding to a relative orientation of the particular given motor.

4. The aerial vehicle of claim 1, wherein the each of the plurality of propulsion controllers are configured to, after stabilizing the aerial vehicle, automatically generate the commands and control the plurality of propulsion units in order to allow the aerial vehicle to move to a predetermined position.

5. The aerial vehicle of claim 1, wherein each of the plurality of propulsion controllers are configured to identify the failure based on an error message from the control unit.

6. The aerial vehicle of claim 1, wherein each of the plurality of propulsion controllers are configured to identify the failure based on a lack of information received from the control unit during a predetermined amount of time.

7. The aerial vehicle of claim 1, wherein each of the plurality of propulsion controllers are configured to identify the failure based on data received from the control unit and information stored locally in memory of each of the plurality of propulsion controllers.

8. The aerial vehicle of claim 7, wherein the failure includes a particular maneuver corresponding to a particular change in angular acceleration of the aerial vehicle defined in the information stored locally in memory of each of the propulsion controllers.

9. The aerial vehicle of claim 7, wherein the failure corresponds to a particular maneuver corresponding to a particular change in linear acceleration of the aerial vehicle defined in the information stored locally in memory of each of the plurality of propulsion controllers.

10. The aerial vehicle of claim 7, wherein the failure corresponds to a particular maneuver corresponding to a particular change in relative orientation of the aerial vehicle defined in the information stored locally in memory of each of the plurality of propulsion controllers.

11. The aerial vehicle of claim 7, wherein the data includes instructions to cause the aerial vehicle perform a particular combination of maneuvers defined in the information stored locally in memory of each of the plurality of propulsion controllers.

12. The aerial vehicle of claim 1, further comprising a bus configured to provide a communication link between the control unit and the plurality of propulsion controllers, wherein when the failure is not at the bus, the propulsion controllers of the plurality of propulsion controllers may communicate with one another in order to attempt to stabilize the aerial vehicle.

13. The aerial vehicle of claim 12, wherein each given propulsion controller of the plurality of propulsion controllers is configured to send attitude information from the IMU of the given propulsion controller with each other propulsion controller of the plurality of propulsion controllers in order to attempt to stabilize the aerial vehicle.

14. The aerial vehicle of claim 13, wherein each given propulsion controller of the plurality of propulsion controllers is configured to identify a failed IMU of the plurality of IMUs and ignore the attitude information from the failed IMU.

15. The aerial vehicle of claim 1, further comprising a bus configured to provide a communication link between the control unit and the plurality of propulsion controllers, wherein when the failure is at the bus, the propulsion controllers of the plurality of propulsion controllers are configured to attempt to stabilize the aerial vehicle without using information from other of the plurality of propulsion controllers.

16. The aerial vehicle of claim 1, wherein each of the plurality of propulsion controllers is configured to attempt to stabilize the aerial vehicle by achieving a predetermined attitude.

17. The aerial vehicle of claim 1, further comprising:
- a plurality of batteries, each batter of the plurality of batteries being configured to power a corresponding one of the plurality of propulsion controllers; and
- a plurality of switches configured to connect and disconnect the plurality of batteries from each of the plurality of propulsion controllers when a failure of one of the plurality of batteries occurs.

18. The aerial vehicle of claim 17, further comprising a plurality of sensors configured to provide sensor feedback for each of the plurality of batteries, and wherein the control unit is further configured to control states of the plurality of switches based on the sensor feedback.

19. The aerial vehicle of claim 17, further comprising:
- a plurality of sensors configured to provide sensor feedback for each of the plurality of batteries; and
- for each of the plurality of switches, a dedicated switch controller configured to control states of at least one of the plurality of switches based on the sensor feedback.

20. The aerial vehicle of claim 17, wherein the plurality of switches includes at least one transistor switch.

* * * * *